US007742045B2

(12) United States Patent
Myers

(10) Patent No.: US 7,742,045 B2
(45) Date of Patent: *Jun. 22, 2010

(54) SYSTEM AND METHOD FOR AN ENHANCED ANALOG VIDEO INTERFACE

(75) Inventor: Robert L. Myers, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

This patent is subject to a terminal disclaimer.

(21) Appl. No.: 10/186,864

(22) Filed: Jun. 28, 2002

(65) Prior Publication Data

US 2004/0001057 A1 Jan. 1, 2004

(51) Int. Cl.
*G06F 3/038* (2006.01)

(52) U.S. Cl. ....................................... 345/213; 348/540

(58) Field of Classification Search .............. 315/169.3; 345/99, 10, 204, 209, 213, 694, 696, 698, 345/699; 348/522, 572, 540, 500, 501, 503, 348/544

See application file for complete search history.

(56) References Cited

U.S. PATENT DOCUMENTS 5,303,065 A * 4/1994 Kwarta ....................... 358/409
5,675,355 A * 10/1997 Chiu et al. ..................... 345/99
5,909,201 A * 6/1999 Hush et al. ................. 345/74.1
5,940,136 A * 8/1999 Abe et al. .................... 348/537
6,025,817 A * 2/2000 Uno et al. ...................... 345/38
6,552,738 B1 * 4/2003 Lin et al. ..................... 345/810
6,804,724 B2 * 10/2004 Shin ............................. 710/2
2002/0015053 A1 * 2/2002 Fukuda et al. .............. 345/660
2002/0167365 A1 * 11/2002 Smith .......................... 331/100

OTHER PUBLICATIONS

VGA analogue display connector from http://www.epanorama.net/documents/pc/vga_bd15.html, Apr. 15, 2002.

* cited by examiner

*Primary Examiner*—Jimmy H Nguyen

(57) ABSTRACT

A method is provided for accurately sampling pixels in a fixed-format display, which is connected to a host computer through an analog video display adapter. The method comprises the step of confirming that the fixed-format display is able to receive a pixel clock signal from the analog video display adapter. Another step is sending the pixel clock signal across an analog video sync line so that synchronization data and the pixel clock signal will be contained on the analog video sync line. An additional step is receiving the pixel clock signal in the fixed-format display. A further step is applying the pixel clock signal in the fixed-format display to sample pixels.

8 Claims, 6 Drawing Sheets

| Pin | Definition |
|---|---|
| 1 | Red Video |
| 2 | Green Video |
| 3 | Blue Video |
| 4 | (Optional) |
| 5 | Return |
| 6 | Red Return |
| 7 | Green Return |
| 8 | Blue Return |
| 9 | DDC +5V |
| 10 | Sync Return |
| 11 | (Optional) |
| 12 | DDC Data (SDA) |
| 13 | Horizontal Sync |
| 14 | Vertical Sync |
| 15 | DDC Clk (SCL) |

FIG. 1
(PRIOR ART)

Orig. H sync.

H sync. with 1/8-rate clock
(/CLK_ENABLE asserted)

SYSTEM AND METHOD FOR AN ENHANCED ANALOG VIDEO INTERFACE

FIELD OF THE INVENTION

The present invention relates generally to enhancing an analog video interface.

BACKGROUND

The current analog video interface used in the personal computer (PC) industry is commonly referred to as the VGA standard and this interface has served for over 15 years in the PC world. This interface continues to be the de facto standard video connection and is still used with the vast majority of displays and graphics hardware sold today. However, this long used interface suffers from several shortcomings, especially in its suitability for use with fixed-format displays, such as liquid crystal displays (LCDs).

Newer and more capable interfaces have been introduced in an attempt to address these shortcomings. Two of the more widely recognized standards are the Plug & Display (P&D) standard from the Video Electronics Standards Association (VESA), and the Digital Visual Interface (DVI) standard from the Digital Display Working Group (DDWG). Both the P&D and DVI standards have offered a generally digital interface for use with non-CRT displays, under the belief that such displays are more suited to a digital form of video transmission.

These standards have seen very limited acceptance, primarily due to the lack of compatibility with the earlier VGA standard. Unfortunately, this means that fixed-format displays must continue to use the VGA interface despite its limitations.

SUMMARY OF THE INVENTION

The invention provides a method for accurately sampling pixels in a fixed-format display, which is connected to a host computer through an analog video display adapter. The method comprises the step of confirming that the fixed-format display is able to receive a pixel clock signal from the analog video display adapter. Another step is sending the pixel clock signal across an analog video sync line so that synchronization data and the pixel clock signal will be contained on the analog video sync line. An additional step is receiving the pixel clock signal in the fixed-format display. A further step is applying the pixel clock signal in the fixed-format display to sample pixels.

BRIEF DESCRIPTION OF THE DRAWINGS

FIG. 1 is a table illustrating the pin layout for an analog VGA video adapter;

DETAILED DESCRIPTION

Figure 2:
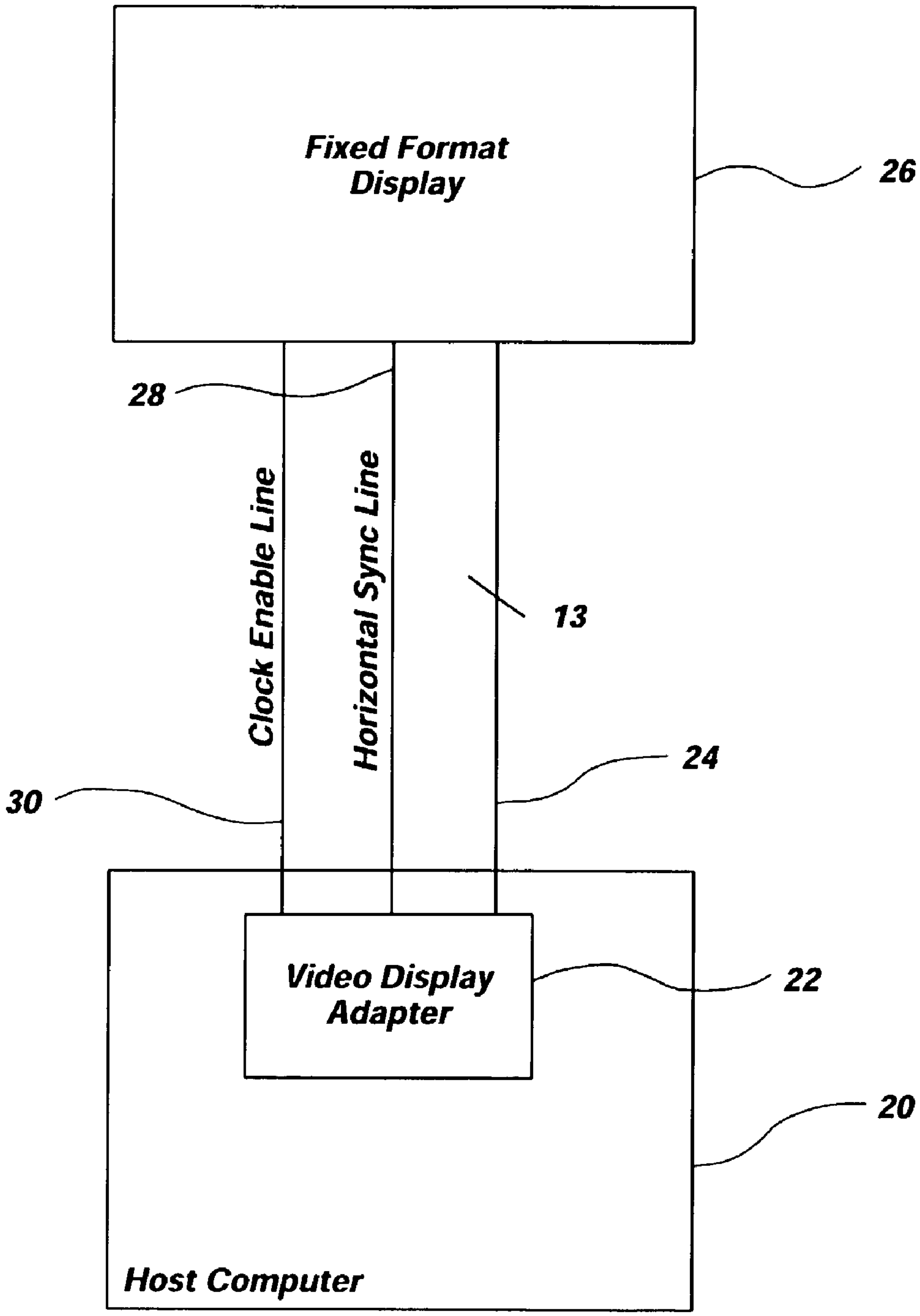
FIG. 2 is a block diagram depicting a connection between a video display adapter and a fixed-format display.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A recent trend in the computer industry has been the introduction of video interface standards employing a digital transmission system. This trend is based on the belief that non-CRT display devices (such as LCDs) are "inherently digital" and are best served by a digital interface. However, this belief is not necessarily true. The majority of the popular non-CRT display technologies are distinguished from CRT displays primarily because they are fixed-format display devices not because they require digital input. This means that the display proper in such technologies provides a fixed number of physical picture elements or pixels through which the image information can be displayed to the user. These picture elements are generally arranged in horizontal rows and vertical columns. Some additional examples of fixed-format displays are plasma display panels, electroluminescent displays, field-emission displays, organic-LED (OLED) displays, and any other display with discrete physical pixels.

A fixed-format arrangement does not necessarily define whether this display type is best served by digital or analog encoding of the image information. What is valuable in a fixed-format display is the accurate sampling of the incoming image information. Accurate sampling allows each sample of the image data to be assigned unambiguously to the proper physical pixel of the display device.

The fact that many "digital" interfaces directly provide a sampling clock for the purpose of accurate pixel sampling makes them well suited for use with fixed-format displays. Regrettably, a lack of backwards compatibility, cost, and added complexity have been a large hurdle for these standards to overcome in finding widespread adoption.

New analog video standards employing different interfaces have been proposed in the past, but these standards have suffered from being completely incompatible with the existing VGA standard. One example of such a standard is the VESA Enhanced Video Connector or EVC. Gaining access to the features of this new standard requires use of a new connector, rather than being usable to at least some degree with the existing connector. So again, these newer standards have seen limited acceptance.

In contrast, the analog video standards used to date have not provided timing information to a degree finer than signaling the start of each new line. As a result, fixed-format displays supporting such interfaces have generally derived their sampling clocks from this line timing or horizontal synchronization signal (sync signal) with limited accuracy. When a fixed-format display receives a video signal from an analog video adapter (e.g. VGA), the fixed-format display does not know exactly where the active video line begins or ends, but the analog video can be roughly and sometimes inaccurately sampled according to the horizontal sync signal. Unfortunately, a certain amount of error is introduced when a secondary clock is derived from the horizontal sync signal. This is because the horizontal sync signal is unstable and contains a significant amount of noise due to the instability of the signal in time with respect to the video data signal. In other words, there is a significant amount of jitter and skew of the horizontal sync signal with respect to the video data signal. Furthermore, the horizontal sync signal was not intended to be a frequency reference. When the horizontal sync signal is multiplied up by a factor of hundreds or thousands to get a pixel rate clock signal, the noise in the signal is magnified. This is because larger multipliers are generally more prone to noise.

Even if a separate timing line is provided using an available pin in an analog video interface, it is difficult to correlate that clock input with the RGB (Red, Green, Blue) video input. Controlling the skew or alignment between the clock signal and the active RGB video is generally not feasible. There may be delays in the output from the circuits generating the signals and variations in the cable lengths used. This means that the display will not be able to synchronize an independent clock signal with the RGB video to within nanoseconds, as needed. In other words, the lack of synchronization between a separate clock signal and the video signal means that implementing a clock signal on a separate line is not a viable option in an analog video interface.

In light of these problems, the present system and method provide an analog video system capable of properly supporting fixed-format display types by including a sampling clock, or a signal from which such a clock may be more accurately derived. In order to supply this information, the present invention provides a timing signal or pixel sampling clock at a pre-determined rate via the analog video interface that is already in use. Thus, the present invention supports new display types, while permitting true backwards compatibility with the existing analog interface.

The addition of a sampling clock can be achieved using the existing analog VGA interface standard as one embodiment of the invention. Therefore, a system may be defined that provides a high degree of backwards compatibility. These additional features can be provided on the existing analog interface standards, in a way which maintains compatibility with existing displays and graphics hardware.

In order to understand the present invention, it is helpful to first describe one specific existing interface. Following this description, the enhanced signal definition will be presented in further detail. This description will include the modifications to be made to the interface signals and their application within the current analog systems.

The current de facto standard interface or VGA standard is based on a 15-pin high density D subminiature connector with a pinout as shown in FIG. 1. In addition, the following basic specifications are established for this system:

A. There are three video signals, providing luminance information for each of three primary color channels (Red, Green, and Blue). These are positive white signals where increasing the positive signal voltage with respect to the reference increases the luminance of that channel on the display. The signals have an amplitude of approximately 0.7 Vp-p, with an impedance of 75 ohms, and the signals are assumed to be AC coupled in order to block certain levels of DC voltages. The reference level for such signals are established by requiring that all three of these channels be at a defined “blanking” level during the time around the horizontal sync pulse, at which time the display will “clamp” or set an internal reference to this level. Each video signal is provided with a dedicated return line or ground.

B. In the VGA standard, timing information is not directly provided by the video signals themselves. Instead, horizontal line and vertical frame or field synchronization signals (syncs) are provided in the form of separate TTL signal lines, each on their own pin but sharing a common return.

C. Display identification and control is provided through a general purpose communications channel, established by the VESA Display Data Channel standard. This occupies pins 9, 12, and 15.

The modifications to these signal definitions are to be made in such a manner that an enhanced video display adapter or host will still be capable of driving an old VGA display without difficulty. This provides backwards compatibility along with new functionality. Further, a display that is capable of using the enhanced functions can still be made to work generally within the original interface definition. When an analog video display interface is discussed in this description, the specific VGA interface has been referenced. In addition to the VGA interface, other video display interfaces can be enhanced with the features and elements of the present invention.

The present embodiment of the invention takes advantage of the two remaining pins defined as optional or reserved in the existing definition, and uses these to indicate compatibility with the enhanced system. FIG. 2 illustrates that a host computer 20 can contain an analog video display adapter 22 (e.g., a graphics card) that outputs analog video signals. A fixed-format display 26 is included in the system to receive and display video signals from the analog video display adapter.

Under this improved system, a pixel clock signal is provided by inserting a clock signal of a pre-determined pixel rate (such as 1/N of the actual pixel clock rate) onto the horizontal sync signal 28, except during the period normally occupied by the horizontal sync pulse. This pixel clock signal is sent on the horizontal sync line when the display has signaled that it can accept such a clock. One way of confirming that the display can receive the enhanced signal is by grounding a pin. For example, pin 4 can be grounded in the VGA interface. This line was previously optional and is now seen by the host as the /CLK_ENABLE 30. If the display does not enable this pixel clock by grounding this pin, the horizontal sync pulse is transmitted normally. In addition, the remainder of the video display lines 24 will continue to transfer information as defined by the analog video interface definition. The remaining video lines are illustrated by conventional circuit diagram notation with a slash across a single line and the number of data lines represented next to the line (13 data lines in this case).

There are other ways of confirming that the display is able to receive the enhanced signal. One way is that the display can signal its capability for accepting the pixel clock signal via the display identification information contained in the Extended Display Identification Data (EDID) file, which is a VESA defined block of information communicated over the Display Data Channel (DDC). Alternatively, a confirmation signal can be sent on a separate signal line when no other information is being sent to the display on that separate line. Another possible confirmation method is the use of an extended connector that is backwards compatible with the VGA standard but provides additional lines that are recognized when connected to the enhanced display. For example, the 15-pin D connector can include an expanded connector portion for new video display adapters and displays to use, which would not interfere with the normal connection of the 15-pin D connector. This latter type of implementation may increase cable costs but it provides a simple way of enabling the system. Other suitable handshake means can also be devised by those skilled in the art.

Figure 3A:
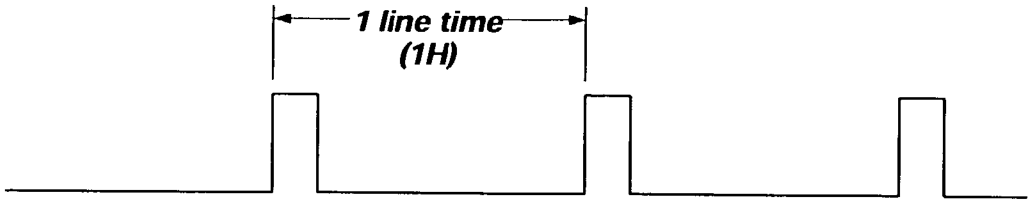
FIG. 3A illustrates the output from a horizontal sync signal line.
Figure 3B:
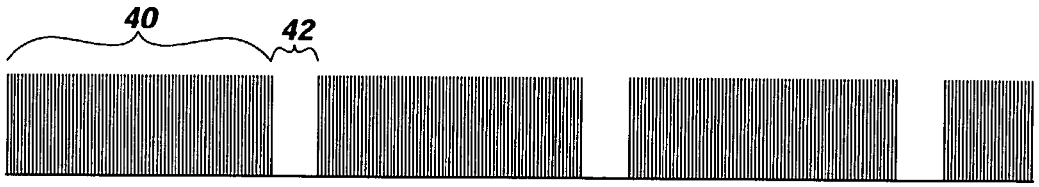
FIG. 3B illustrates an enhanced horizontal sync signal with a ⅛ pixel rate clock.

FIG. 3A illustrates a wave form for a horizontal sync signal where a pulse is generated to signal the beginning of each horizontal line of pixels in the CRT. Displayed directly below the horizontal sync signal in FIG. 3B is the modified horizontal sync signal with the pixel clock signal.

When the /CLK_ENABLE line is held low by the display, a 1/N rate pixel clock can be transmitted on the horizontal sync line 40. In addition, no signal is transmitted during the time which corresponds to the horizontal sync pulse in the conventional interface definition 42. In other words, the clock is absent when the horizontal sync pulse would have been sent and the duration of this absence now defines the duration of the horizontal sync pulse as seen by the enhanced display. Absence of the clock is defined as the lack of a transition on this line for a pre-defined number of successive periods (e.g., three periods or 12 pixel times at the ⅛ rate) with the sense of the horizontal sync pulse set by the state of the line during the horizontal sync pulse time. The host's pixel clock generator will advance the position of the horizontal sync by the defined number of pixel times (e.g., 12 pixel times) to compensate for the delay inherent in this system. Upon receiving three successive clock transitions at the end of the horizontal sync pulse time, the display will know that the horizontal sync pulse has terminated.

In the situation where the /CLK_ENABLE input line at the host is not grounded or is floating, the horizontal sync line is used as defined by the analog interface definition (e.g. VGA). This means that the horizontal sync pulse is provided to the display with its horizontal sync pulse according to the well-known definition as illustrated in FIG. 3A. In essence, the horizontal sync pulse is passed through unchanged.

If the display is holding the /CLK_ENABLE input line low but it detects no clock activity on the horizontal sync line, the display can assume that the host is not compatible with this enhanced system. Then the display will use the horizontal sync line as originally defined. The display determines whether or not there is clock activity on the horizontal sync line based on whether it detects regular transitions on the line above a pre-determined threshold rate. For example, a 2 MHz rate can be set as the pre-determined threshold rate.

The use of an ⅛ rate clock permits up to 500 MHz pixel rates to be supported with no higher than a 62.5 MHz signal on this line. It is assumed that displays supporting this system will provide suitable cabling for this signal. The use of a ⅛ pixel clock provides the advantage that the clock can be sent at a lower rate and then multiplied up on the display side using a programmable phase locked loop (PLL). This avoids some of the problems associated with sending a high frequency signal across a cable that was not necessarily designed for higher frequencies. Of course, other pixel clock rates can be used such as the actual pixel clock rate, ½, ¼, 1/16, or 1/32 pixel clock rates or other suitable pixel clock rates.

Figure 4:
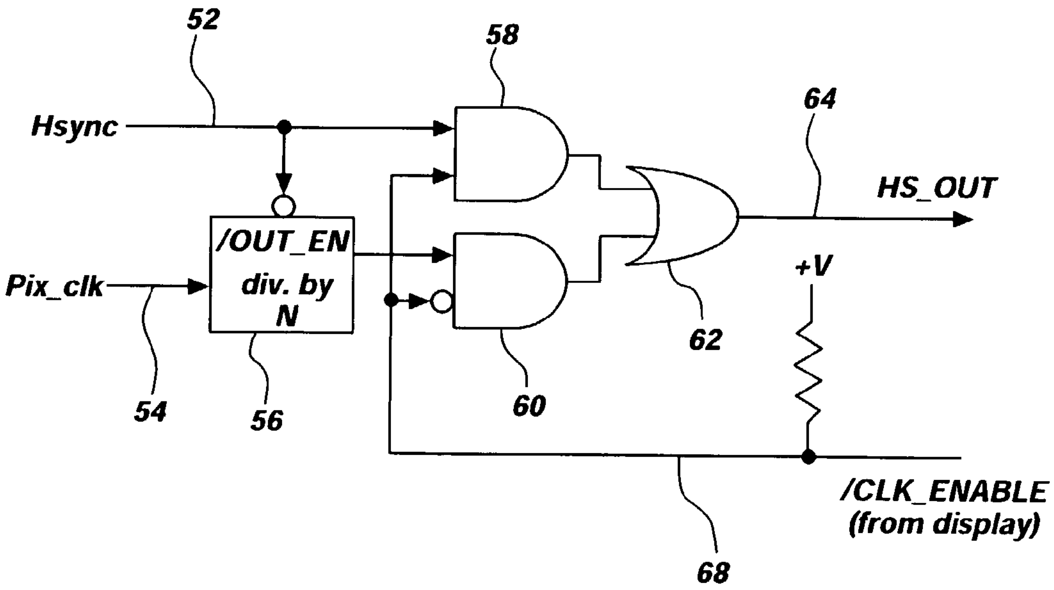
FIG. 4 is a schematic diagram of a circuit for providing a clock signal on a horizontal sync signal line.

FIG. 4 illustrates a schematic diagram of a circuit used to alternate between the horizontal sync signal and pixel clock modes on the horizontal sync line. This schematic should be viewed as a functional or logical description of how the circuit may work and alternative implementations may be devised. In FIG. 4, the horizontal sync input 52 is received from the analog interface (FIG. 3A) and this signal is delivered to a first AND gate 58. An incoming pixel clock signal 54 is provided to a dividing module 56 which also receives the inverted horizontal sync signal. The output of the dividing module is an enhanced output where the clock signal has been divided by some factor X (e.g. the factor 8) and combined with the inverted input from the horizontal sync signal (FIG. 3B). This pixel clock signal is sent to a second AND gate 60. The first and second AND gates are effectively enabled or disabled by the /CLK_ENABLE line 68 which provides an input to the first AND gate and an inverted input to the second AND gate. This means that when the first AND gate is disabled by the /CLK_ENABLE line being held low, then the second AND gate will be enabled to send the enhanced signal to the OR gate 62. When the /CLK_ENABLE signal is floating or high, then the reverse situation applies. The signal from the currently enabled AND gate is then passed through the OR gate and is the transmitted on the /HS_OUT line 64 (horizontal sync output line) to the display.

Figure 5:
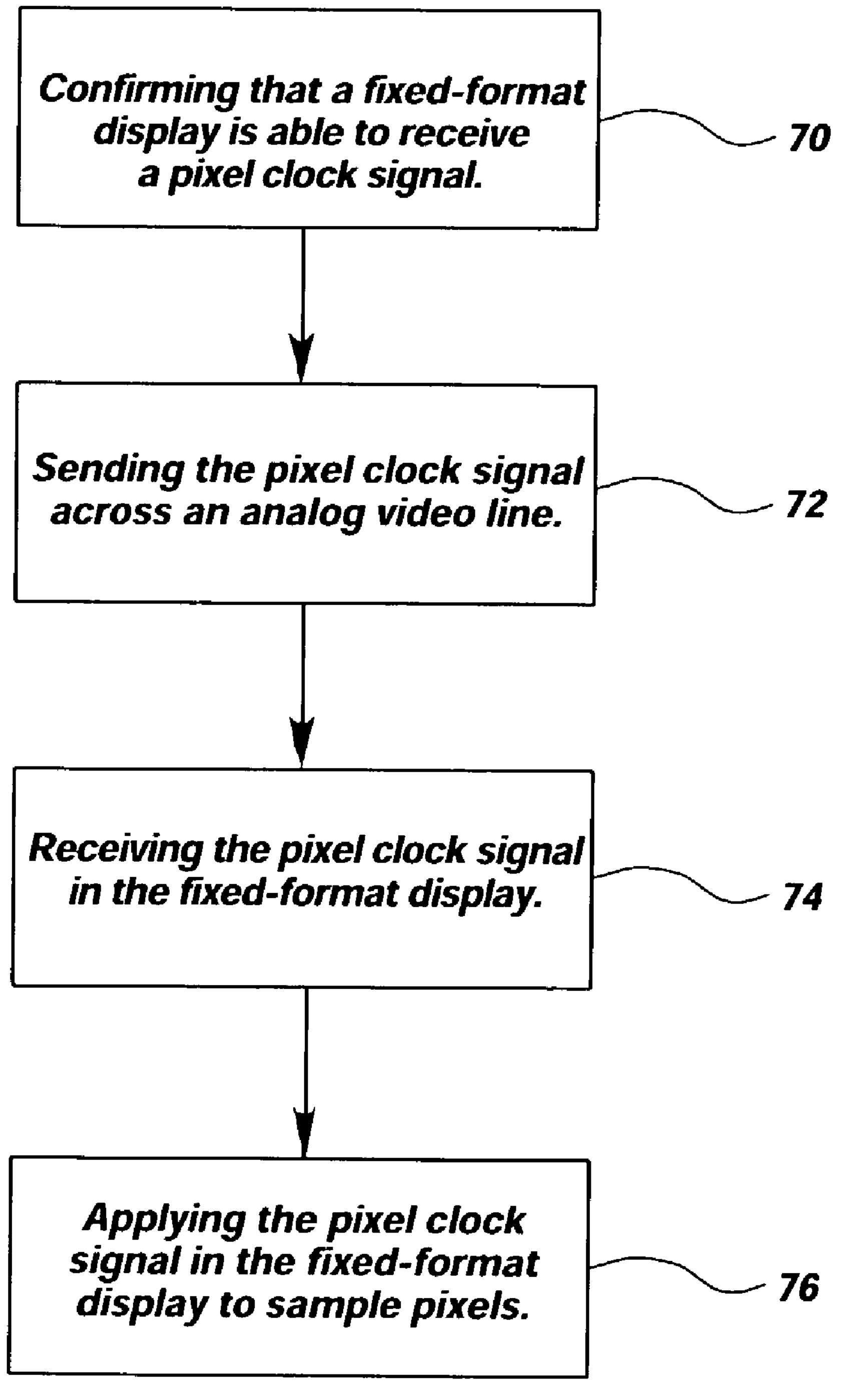
FIG. 5 is a flowchart showing steps involved in a method for enhancing an analog video signal.

FIG. 5 is a flowchart showing steps in a method for enhancing an analog video signal. One embodiment of the invention is a method for accurately sampling pixels in a fixed-format display. The display is connected to a host computer through an analog video display adapter. An initial step is confirming that the fixed-format display is able to receive a pixel clock signal from the analog video display adapter 70. As discussed earlier, there are a number of ways of confirming that the display is able to receive a pixel clock signal, such as grounding a line, sending data across another video line, a radio connection, connector compatibility, and other similar means of confirmation.

Another step is sending the pixel clock signal across an analog video sync line so that synchronization data and the pixel clock signal will be contained on the analog video sync line 72. Sending the synchronization data and pixel clock signal on the same line is significant because this helps make the system backwards compatible with the previously defined analog video adapter standard. Otherwise, the pixel clock information requires its own transmission line which is problematic in an analog system. In addition, it is the combination of the pixel clock with the horizontal sync signal that makes the enhanced system more accurate while maintaining backwards compatibility. A further step is receiving the pixel clock signal in the fixed-format display 74. Then the pixel clock signal is applied in the fixed-format display to sample pixels. The pixel clock is generally applied by multiplying up the pixel clock signal so it can be used to sample the pixels from the analog RGB lines that are received by the fixed-format display.

Figure 6:
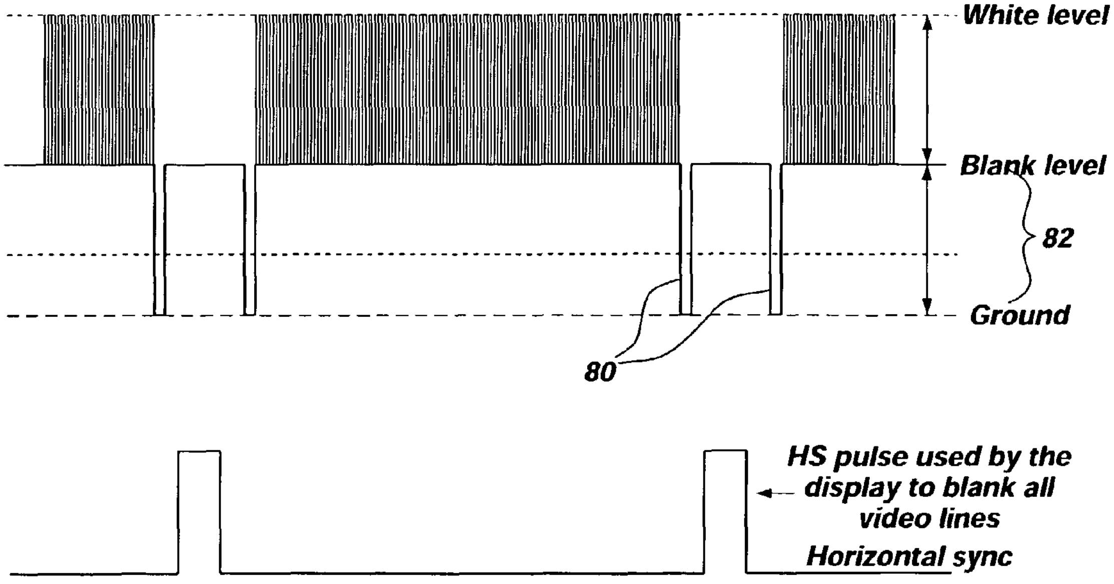
FIG. 6 illustrates a negative-going amplitude pulse to identify endpoints of the active video period.

Referring now to FIG. 6, the present invention includes a system and method for synchronizing the beginning and ending of a horizontal line time and/or a vertical frame using negative-going pulses. These additional pulses are useful because they aid in synchronizing the pixel clock signal and the horizontal line periods. This feature is not enabled unless the display signals compatibility with this additional pulse definition by grounding a pin on the video connector or otherwise confirms it can translate the negative-going pulses. In the case of a VGA connection, pin 11 or another remaining unused pin can be defined to be the /PULSE_ENABLE signal line. With this pin held low by the display, the host system and video display adapter can be permitted to provide amplitude/image edge reference pulses that are negative-going.

In order to provide the negative-going signal, all video signals will be transmitted with a DC offset relative to the signal return connection. The offset is equal to the peak white amplitude referenced to the blanking level. This means the DC level of the signal during the blanking time will be offset from the signal return or ground with the same amplitude amount as white is defined relative to blank. In other words, the blanking level is defined to be at the DC offset instead of 0V. This DC offset may be present at all times even if the /PULSE_ENABLE is not asserted, because existing displays typically provide AC coupled inputs capable of at least +/−2.0V DC offset. Other offset levels can also be used if a reduced amplitude negative-going pulse is going to be sent instead.

When the /PULSE_ENABLE line is grounded by the display, the host can provide negative-going pulses 40 on each video signal line. The pulses will have a pre-determined duration and they will be provided immediately before and/or immediately after the active video portion of each horizontal line time. As a result, the negative-going pulses will mark the endpoints of the active video portion.

In addition, the host can provide similar pulses of a pre-determined duration in the same time slots, at the beginning of the first and last lines of the vertical blanking period. These pulses can be used to determine the start of the active video periods, both vertically and horizontally. A pulse length can be used to identify whether the pulse is marking the beginning and end of the individual horizontal lines within a frame or the beginning and end of a complete frame. A narrower pulse can identify a horizontal line and a wider pulse can define the vertical beginning and end of the frame. For example, a vertical negative-going pulse can be 2-4 times wider than a horizontal negative-going pulse or a horizontal pulse can be 8 pixels wide and the vertical can be 32 pixels wide. Since the pulses are of short duration and are directed below the reference blanking level, they will not be visible in the displayed image.

The negative pulses help align the pixel clock signal with the beginning and end of the horizontal line time. In the past, video signals that have been sent to a display are generally not able to identify an accurate starting or ending point for a video period. Being able to identify the starting point for an active video line and aligning that start point with the pixel sampling clock provides an accurate method for sampling a fixed-format display.

This system and method can be used in other host to video display interfaces. As described above, this proposed analog interface is fully supportable on the existing VGA standard connection. However, the present invention can also be used with other physical interfaces and the enhanced interface will potentially benefit from the improved electrical performance of more modern connections. Three physical connections which have generated the most current interest are the VESA Plug & Display (P&D) standard, the M1 interface standards, and the Digital Visual Interface (DVI) interface specification from the Digital Display Working Group. All three interfaces are taken from the same family, employing the MicroCross™ pseudo coaxial connection for the analog video signal lines (developed by Molex Corp.). The primary difference between these standards in terms of the physical connection is the number of pins, in addition to the four pin MicroCross™ provided by each connector. The VESA connectors each provide 30 additional pin positions (organized as three rows of ten pins each), while the DDWG connector is slightly smaller, providing only 24 additional pins (3 rows of eight).

For example, the M1 definition has a sufficient number of reserved pins so as to easily redefine two pins to carry the /CLK_ENABLE and /PULSE_ENABLE signals from the display to the host. The DVI connector at present has no free pins, and so these flags could not be added as dedicated lines. Should it become desirable to support this enhanced video system on the DVI connector, it is recommended that these be communicated via the DDC/CI system.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method for accurately sampling pixels in a fixed-format display, which is connected to a host computer through an analog video display adapter, comprising:

confirming that the fixed-format display is able to receive a pixel clock signal from the analog video display adapter, wherein the pixel clock signal has a frequency less than a fixed-format display pixel rate;

sending the pixel clock signal across an analog video sync line that includes a horizontal sync signal so that the sync signal and the pixel clock signal are contained on the analog video sync line;

receiving the pixel clock signal in the fixed-format display;

applying the pixel clock signal in the fixed-format display to sample pixels; and abstaining from sending the pixel clock signal during periods that correspond to the horizontal sync pulse.

2. A method as in claim 1, wherein sending the pixel clock signal across an analog video sync line further comprises:

sending the pixel clock rate signal at 1/N of the fixed-format display pixel rate across the analog horizontal sync line to the fixed-format display; and the method further comprises multiplying the 1/N pixel rate clock signal up to the fixed-format display pixel rate, wherein N is a natural number greater than 1.

3. A method as in claim 1, wherein sending a pixel clock signal across an analog video sync line further comprises sending the pixel clock signal at 1/N of the fixed-format display pixel rate, wherein N is a natural number greater than 1.

4. A method as in claim 1, further comprising multiplying the pixel clock signal up to the fixed-format display pixel rate to enable the fixed-format display to sample each pixel in the fixed-format display.

5. A method as in claim 1, wherein confirming that the fixed-format display is able to receive a pixel clock signal from the analog video display adapter, further comprises signaling through an enable line that the fixed-format display is able to receive a pixel clock signal.

6. A method as in claim 5, wherein signaling through an enable line further comprises holding the enable line to a low voltage to signal that the fixed-format display can accept the pixel clock signal.

7. A method as in claim 5, wherein signaling through an enable line further comprises sending a message and then a response between the host computer and the fixed-format display to signal that the fixed-format display can accept the pixel clock signal.

8. A method as in claim 1, wherein the analog video display adapter is a VGA adapter.

* * * * *